United States Patent [19]

Kakuta

[11] Patent Number: 5,115,641
[45] Date of Patent: May 26, 1992

[54] METHOD OF AND APPARATUS FOR DRIVING TURBOSUPERCHARGER

[76] Inventor: Yoshiaki Kakuta, 1-8-1, Hamakawado, Kasukabe-Shi, Saitama-Ken, Japan

[21] Appl. No.: 585,510

[22] Filed: Sep. 20, 1990

[30] Foreign Application Priority Data

Sep. 21, 1989 [JP] Japan .................. 1-247535

[51] Int. Cl.$^5$ ............................. F02B 33/44
[52] U.S. Cl. ..................... 60/605.1; 60/316; 60/274
[58] Field of Search ........... 60/605.1, 614, 316, 60/280, 319, 324, 274

[56] References Cited

U.S. PATENT DOCUMENTS

| 3,844,119 | 10/1974 | Herrbrich | 60/288 |
| 4,023,360 | 5/1977 | Wössner et al. | 60/288 |
| 4,864,825 | 9/1989 | Kakuta | 60/319 |

FOREIGN PATENT DOCUMENTS

| 7601505 | 1/1976 | France | 60/605.1 |
| 2130643 | 6/1984 | United Kingdom | 60/324 |

OTHER PUBLICATIONS

Introduction to Fluid Mechanics, Third Edition, by Fox and McDonald, John Wiley & Sons.

*Primary Examiner*—Richard A. Bertsch
*Assistant Examiner*—Charles G. Freay
*Attorney, Agent, or Firm*—Fleit, Jacobson, Cohn, Price, Holman & Stern

[57] ABSTRACT

The present invention provides a method of and an apparatus for driving a turbosupercharger wherein including an exhaust gas turbine (61) is driven by the exhaust gas energy of an internal combustion engine (1), and a supercharging turbine (62) is actuated driven by the exhaust gas turbine, so as to supercharge the engine with suction intake air; characterized in that suction air wherein exhaust gas, streams of in exhaust pipe (2) generate negative pressure (5) which is connection (10) to the turbine outlet (8) from which exhaust gas streams passed passing through the exhaust gas turbine are emitted, whereby the exhaust gas streams to flow to at the turbine outlet are is drawn off to assist in the driving of by suction, and the exhaust gas turbine is driven under a positive pressure and simultaneously under a negative pressure based on the force of the suction.

6 Claims, 4 Drawing Sheets

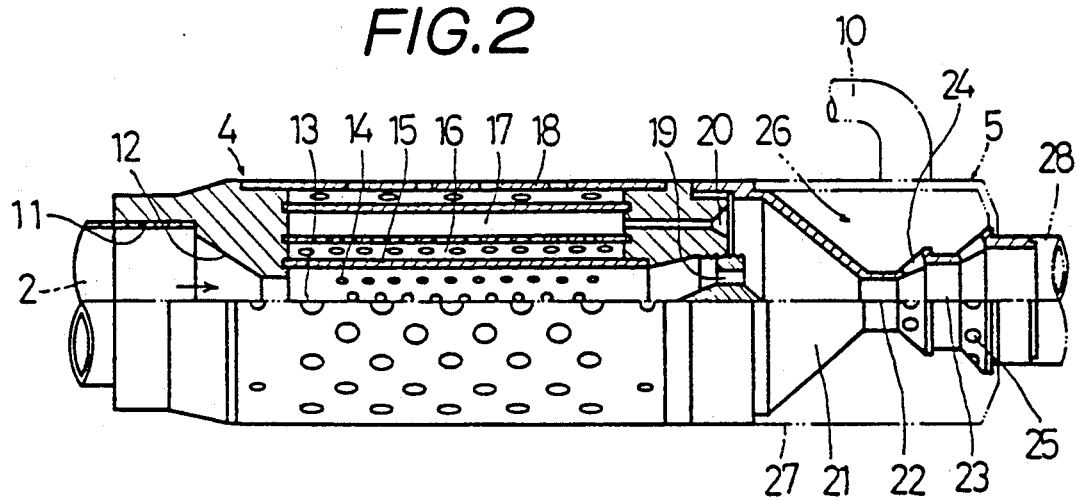
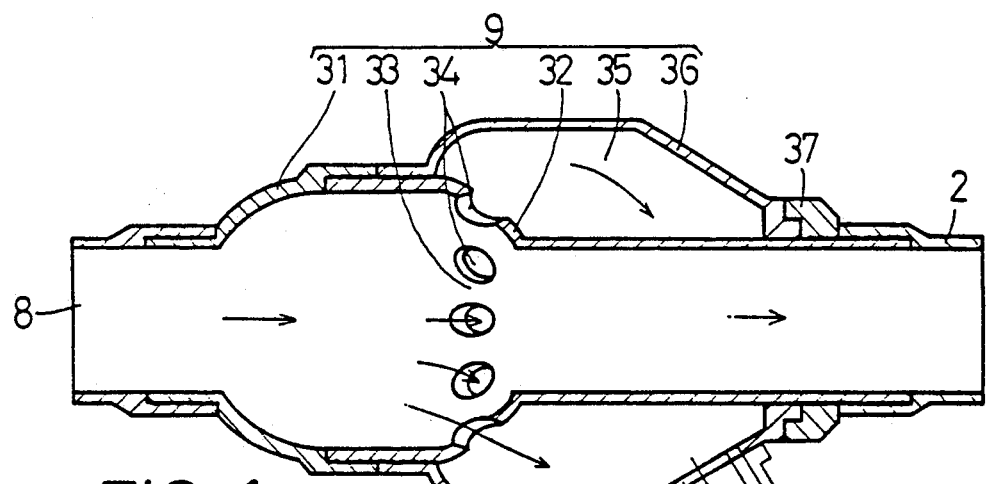
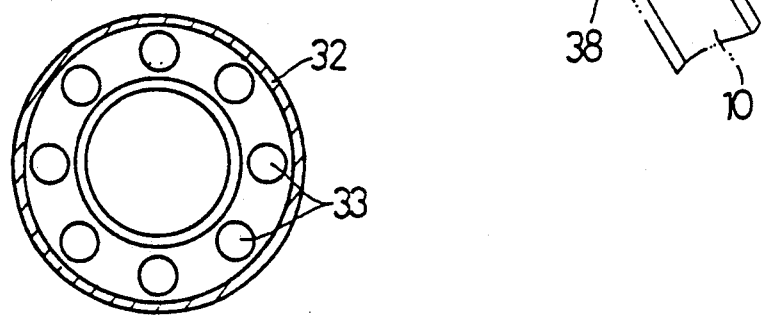

METHOD OF AND APPARATUS FOR DRIVING TURBOSUPERCHARGER

BACKGROUND OF THE INVENTION

1. Field of the Invention

The present invention relates to a method of and an apparatus for driving a turbosupercharger wherein an exhaust gas turbine is driven with the exhaust gas energy of an internal combustion engine and is used for actuating a supercharging turbine, thereby to supercharge the engine with suction air.

2. Description of the Prior Art

There has been well known an exhaust gas turbine-supercharging system wherein an exhaust gas turbine is rotated by utilizing exhaust gas energy, thereby to drive a supercharger so as to supercharge an engine with suction air. Particularly in recent years, examples of the supercharging system installed on the engines of automobiles have increased.

A turbosupercharger in the prior art is usually constructed of only one stage of centrifugal turbine, the power of which is obtained in such a way that exhaust gas brought out of the combustion chamber of an engine is partly or wholly passed through an exhaust gas turbine so as to change the kinetic energy thereof into a rotational motion. The supercharging turbine supercharges the combustion chamber with suction air at a heightened density together with vaporized fuel.

The prior-art system mentioned above, however, incurs the following problems:

1) A time lag is involved before a turbo effect develops.

2) A sudden change in the output of the system is induced by the turbo effect.

3) Maximizing phenomena in which a boost pressure and engine r.p.m. (revolutions per minute) reach the maximum values, appear early.

4) The overheat rate of the engine is high.

5) The efficiency of fuel consumption is prone to worsen.

The inventor made studies on these problems. The problem 1) of the time lag is considered ascribable to the fact that, at the initial stage of the operation of the system, the pressure (back pressure) of the exhaust gas is insufficient on account of a low-speed rotation and the fact that a torque required for starting the exhaust gas turbine is not attained quickly. The problem 2) of the sudden output change is considered ascribable to the rapid rise of the back pressure and the inertia of the rotation.

The problem 3) of the maximizing phenomena is considered ascribable to the fact that the exhaust gas turbine becomes incapable of absorbing the exhaust gas energy sufficiently. The insufficient absorption will be influenced by the nonuniform velocity distribution of exhaust gas streams passing through turbine blades, the occurrence of surging, the inferior emission efficiency of the exhaust gas after passing through the turbine, and so forth. The efficiency of the gas emission is drastically lowered by the very long pipe of an exhaust system, a catalyst, a muffler, etc. Moreover, on account of the decrease of the air density attributed to the exhaust gas at high temperatures, the mean effective pressure ($P_m$) is conspicuously lowered especially in case of a gasoline engine, so that part of the boost effect is canceled. Suction air cooling is required for coping with the decrease of the air density. Meanwhile, the overheat of the engine in the problem 4) becomes liable to occur when the whole engine has a tendency to overheat at all times. Therefore, the overheat is caused by heat which accumulates in peripheral devices due to return flow heat from the supercharger at high temperatures and the low emission efficiency. Further, the efficiency of fuel consumption in the problem 5) will worsen particularly in consequence of the fact that the operation of the system is excessively repeated with the intention of bringing out the turbo effect.

Upon such studies, the inventor has come to the conclusion that the supercharging system in the prior art will be demeritorious in point of the method wherein, in driving the exhaust gas turbine of the supercharger, only the kinetic energy of the exhaust gas streams from the combustion chamber is utilized. One reason therefor is as follows: No demerit will be incurred if the energy of the exhaust gas which is so fast as to exceed the speed of sound can be utilized for the drive of the exhaust gas turbine as it is. Since, however, a high load resistance exists in the lower stream of the exhaust system, the energy of the exhaust gas cannot be sufficiently utilized. Therefore, when the emission efficiency can be equalized to a value in the absence of the resistances of the catalyst, the muffler, etc., the demerit of the insufficient utilization of the exhaust gas energy ought to be solved. Moreover, when the emission efficiency can be enhanced, the problem of the accumulation of heat is relieved, and hence, the enhanced emission efficiency can contribute also to the solution of the heat problem.

The present invention has been made in view of the above circumstances, and has for its object to provide a method of and an apparatus for driving a turbosupercharger in which an exhaust gas turbine is driven under a positive pressure by exhaust gas streams having undergone almost no load resistance, while at the same time, exhaust gas streams having passed through the turbine are drawn off under a negative pressure by suction air streams of lower pressure, whereby the emission efficiency of exhaust gas can be remarkably heightened, thereby to eliminate the aforementioned disadvantages.

In order to accomplish the object, the emission efficiency in the vicinity of the supercharger is intended to become equal to or greater than a value in the absence of a load resistance in an exhaust system.

In a turbosupercharger wherein an exhaust gas turbine is driven with exhaust gas energy, and a supercharging turbine is actuated by the exhaust gas turbine so as to supercharge an engine with suction air the present invention for accomplishing the object adopts a technical expedient in which exhaust gas streams are introduced into a turbine inlet of the exhaust gas turbine, thereby to drive the exhaust gas turbine under a positive pressure, and exhaust gas streams having passed through the exhaust gas turbine are drawn by suction with suction air streams of lower pressure, thereby to simultaneously drive the exhaust gas turbine under a negative pressure.

Regarding the suction air streams, the negative pressure generated by accelerating the exhaust gas streams can be obtained as power, and it is best to utilize this power. Although the negative pressure can also be formed by utilizing electric power or the rotation of a shaft, the output of the engine is reduced at a very high rate on that occasion.

In addition, the method described above should desirably be performed by an apparatus for driving the turbosupercharger, said turbosupercharger including the exhaust gas turbine which has the turbine inlet for introducing the exhaust gas streams emitted at high speed from a combustion chamber of the internal combustion engine and which is driven under the positive pressure by the exhaust gas streams having flowed through the inlet, as well as the supercharging turbine which is actuated by the exhaust gas turbine, comprising an exhaust system pipe which is connected to a turbine outlet for leading out the exhaust gas streams having passed through the exhaust gas turbine and which serves to emit the exhaust gas streams into the atmosphere, a negative pressure generator which is disposed at a part of the exhaust system pipe immediately preceding the emission of the exhaust gas streams into the atmosphere and which accelerates the exhaust gas streams into high-speed air streams again so as to form negative pressure of high intensity, and a suction path which brings the negative pressure generator and the turbine outlet side into communication in order to drive the exhaust gas turbine by the use of the negative pressure formed by the negative pressure generator.

According to the method and apparatus of the present invention, a resistance which the exhaust gas streams passing through the turbosupercharger undergoes is conspicuously decreased, and the r.p.m. of the engine are sharply increased, so that the flow velocity of intake air passing through the supercharging turbine is remarkably heightened to markedly enhance the efficiency of charging. As a result, heat of the exhaust gas which otherwise overheats the supercharge is quickly carried away, so that the supercharger does not fall into an excessively heated state. Moreover, the temperature of the suction air becomes relatively low, so that the air density rises. Also from this viewpoint, the efficiency of charging is heightened.

BRIEF DESCRIPTION OF THE DRAWINGS

The invention will now be described in detail with reference to the accompanying drawings illustrate preferred embodiments of the present invention, in which:

FIG. 2 is a side elevational view, partly in cross section, showing a muffler and negative pressure generator used in the invention of FIG. 1.;

FIG. 3 is a cross-sectional view of suction means used in the invention at FIG. 1;

FIG. 4 is a cross-sectional view of part of the suction means of FIG. 1;

DETAILED DESCRIPTION

Figure 1:
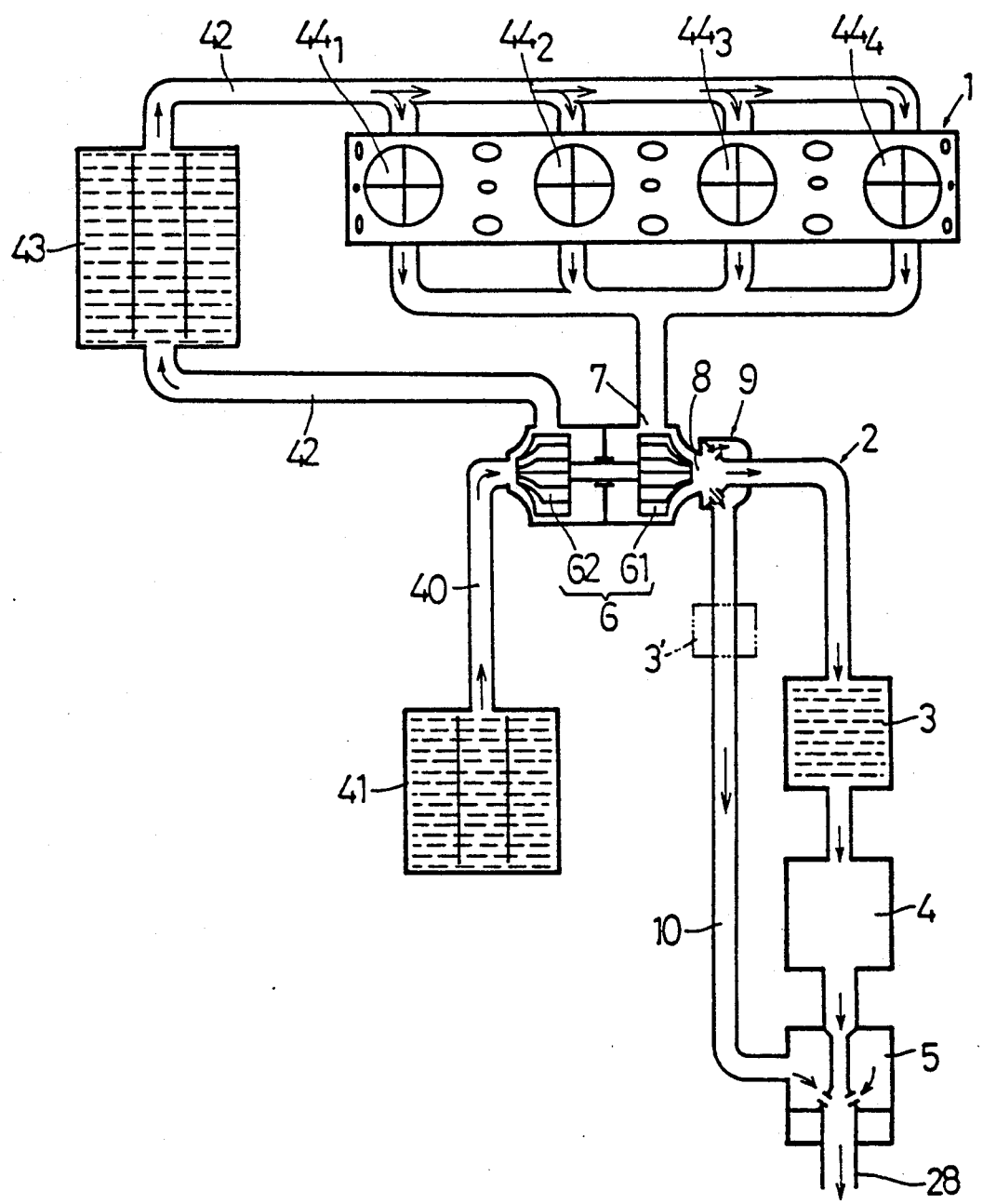
FIG. 1 is a schematic view of the general construction of the first embodiment of a driving apparatus in accordance with the invention.

The general image of the present invention is conceptually shown in FIG. 1. A turbosupercharger 6 is depicted as the conventional type wherein an exhaust gas turbine 61 and a supercharging turbine 62 are coupled by a shaft. It is driven under a positive pressure by the exhaust gas of an engine, while at the same time, it is driven under a negative pressure by suction air streams formed through the acceleration of exhaust gas streams.

Referring to the figure, numeral 1 designates the gasoline engine, numeral 2 an exhaust system pipe, numeral 3 a catalyst unit for purifying the exhaust gas, numeral 4 an exhaust muffler, and numeral 5 a negative pressure generator. Numeral 6 indicates the turbosupercharger, in which the exhaust gas streams flow from a turbine inlet 7 located in the part of the exhaust system pipe 2 immediately succeeding combustion chambers, to a turbine outlet 8 immediately succeeding the exhaust gas turbine 61. Numeral 9 denotes suction means by which the exhaust gas streams having passed through the exhaust gas turbine 61 are drawn by suction, and which is disposed in the part of the exhaust system pipe 2 lying downstream of the turbine outlet 8. The suction means 9 is coupled with the negative pressure generator 5 through a suction pipe 10. In the system of this embodiment, the exhaust system pipe 2 itself, the catalyst unit 3 and the muffler 4 form major load resistances.

The negative pressure generator 5 accelerates the exhaust gas streams again directly before the emission of the exhaust gas into the atmosphere, and the negative pressure thus formed is utilized as suction energy. The muffler 4 is constructed as shown in FIG. 2. More specifically, a connection port 11 with the exhaust system pipe 2 is open at the fore end of the muffler 4, and it is adjoined by a tapered portion 12. A central cylinder 15 is centrally provided with a main flow passage 13 of reduced diameter, and is formed with a large number of vent holes 14 in the peripheral surface thereof. Bypass flow passages 16 and 17 defined in double fashion are formed around the central cylinder 15. A cover 18 is provided at the outermost part of the muffler 4. Owing to such a construction, the exhaust gas streams undergo a silencing action until they reach the negative pressure generator 5 via a main flow passage exit 19 and a bypass flow passage exit 20.

The negative pressure generator 5 is arranged in the lowest streams of the load resistances. In this generator 5, the exhaust gas streams are further accelerated in multistage fashion by a tapered tube portion 21 and first and second acceleration portions 22 and 23, whereby an intense negative pressure is formed. Owing to the negative pressure, a suction chamber 26 which communicates with first and second gas introducing apertures 24 and 25 provided directly behind the respective acceleration portions 22 and 23 is brought into a negative pressure. Thus, gas streams are drawn by suction through the suction pipe 10 which is connected to a casing 27 surrounding the suction chamber 26. The negative pressure generator 5 may well include a single stage of acceleration portion, or three or more stages of acceleration portions.

The volume $V_1$ of the first acceleration portion 22 is set at a value which is required for minimizing the flow velocity of the exhaust gas and obtaining the primary accelerated streams in the tapered tube portion 21. Incidentally, the volume $V_2$ of the second acceleration portion in the embodiment is increased in a relationship of $V_2 = A\ V_1$ (A=2). Of course, the coefficient A can assume any other desired numerical value. The inner diameter of a tail tube 28 should preferably be equal to or greater than that of the second acceleration portion 23. In addition, each of the first and second air introducing apertures 24 and 25 should preferably be endowed with an angle of advance $\theta$. The angle $\theta$ may be set at a value greater than zero and less than 90 degrees, desirably within a range of 10–45 degrees.

It is the feature of the present invention that, owing to the negative pressure of high intensity formed by the negative pressure generator 5 as described above, the exhaust gas streams are drawn by suction from the side of the outlet 8 of the exhaust gas turbine 61. In the embodiment, in order to accelerate the exhaust gas streams at the outlet 8 beforehand, the suction means 9 is further provided at the corresponding part. The suction means 9 is constructed as shown in FIGS. 3 and 4. More specifically, it comprises an expansion tube 31 which is connected to the exhaust gas turbine outlet 8, a throttle tube 32 whose inner diameter is reduced, suction ports 34 which are open in the tapered throttle portion 33 of the tube 32, a suction chamber member 36 which defines a suction chamber 35 while covering the outer peripheral surface of the part of the throttle tube 32 including the suction ports 34, and means 37 for connecting the suction means 9 with the exhaust system pipe 2. Thus, the exhaust gas streams from the turbine 61 are drawn from outside by suction. The suction path 10 mentioned before is connected to the suction chamber member 36, and its connection port is shown at numeral 38 in FIG. 3. The arrangement of the suction ports 34 around the exhaust gas streams as best shown in FIG. 4 is based on the experimental knowledge that it is effective for drawing out the exhaust gas streams which are emitted from the exhaust gas turbine 61.

Referring back to FIG. 1, numeral 40 indicates an intake pipe for air which is drawn into the supercharging turbine 62, and numeral 41 an air cleaner disposed thereat. Further, numeral 42 denotes a suction pipe for compressedly feeding the suction air from the turbine 62 to a suction port, and numeral 43 an intercooler disposed midway of the suction pipe 42. The air taken in is mixed with fuel by fuel feed means not shown, for example, a fuel injection device and a carburetor, and the combustion chambers $44_1$, $44_2$, $44_3$, $44_4$ . . . are charged with the resulting mixture.

Figure 5:
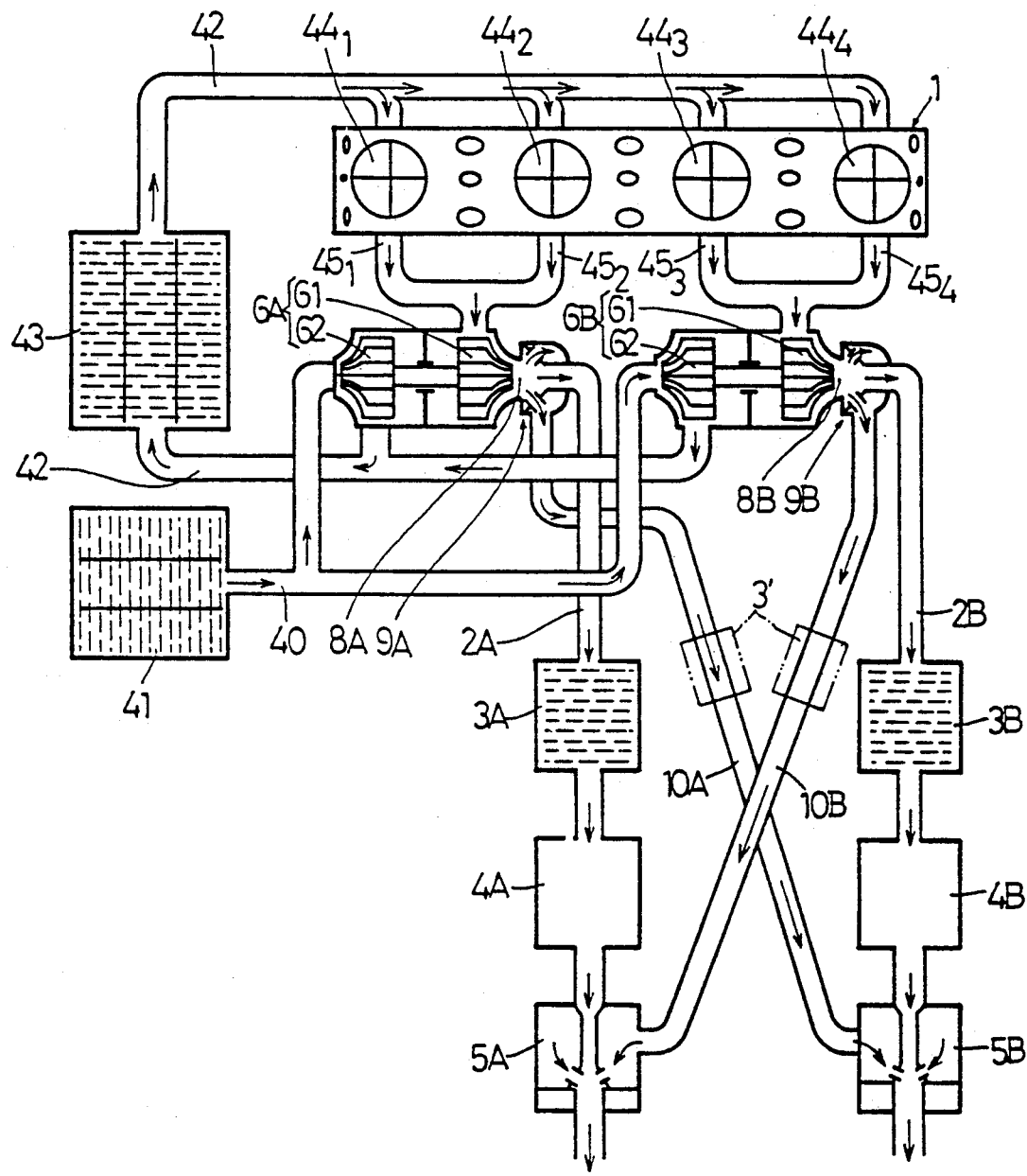
FIG. 5 is a schematic view of the general construction of the second embodiment of the driving apparatus of the invention.

FIG. 5 shows the second embodiment. Herein, the exhaust pipes $45_1$, $45_2$, $45_3$ and $45_4$ of a four-cylinder engine 1 mentioned as an example are divided into two groups in each of which two of the exhaust pipes are put together, and two turbosuperchargers 6A and 6B are driven by the respective groups. For this purpose, pipes 2A and 2B of two exhaust systems are disposed in divided fashion. Accordingly, the streams of exhaust gas emitted from first and second combustion chambers $44_1$ and $44_2$ flow through the respectively corresponding first and second exhaust pipes $45_1$ and $45_2$ and drive the first turbosupercharger 6A, and they are thereafter accelerated by a first negative pressure generator 5A and emitted into the atmosphere via the first exhaust system pipe 2A. On the other hand, the streams of exhaust gas emitted from third and fourth combustion chambers $44_3$ and $44_4$ flow through the respectively corresponding third and fourth exhaust pipes $45_3$ and $45_4$ and drive the second turbosupercharger 6B, and they are thereafter accelerated by a second negative pressure generator 5B and emitted into the atmosphere via the second exhaust system pipe 2B.

First and second suction means 9A and 9B are respectively arranged directly behind the turbine outlet 8A of the first turbosupercharger 6A and directly behind the turbine outlet 8B of the second turbosupercharger 6B. This point is similar to the arrangement in the case of the first embodiment. However, negative pressures for driving the respective suction means 9A and 9B are produced by the negative pressure generators 5B and 5A on the sides opposite to each other. Therefore, suction paths 10A and 10B are arranged crosswise. Let it be supposed that exhaust gas energy based on the first and second combustion chambers $44_1$ and $44_2$ and exhaust gas energy based on the third and fourth combustion chambers $44_3$ and $44_4$ have a difference, and that the former is greater than the latter. Then, a positive pressure for driving the second turbosupercharger 6B ought to become less than a positive pressure for driving the first turbosupercharger 6A. Since, however, the negative pressure produced by the first negative pressure generator 5A becomes stronger, the second turbosupercharger 6B is driven by this stronger negative pressure. When the construction of the second embodiment is adopted in such a case, the outputs of the turbosuperchargers can be averaged by the actions complementary to each other, even in the presence of the differences of the positive pressures and negative pressures which develop in the individual systems. Incidentally, the manner of arranging the exhaust pipes 45 together is not restricted to the above example. Suitable combinations consisting of, for example, the first combustion chamber $44_1$ and fourth combustion chamber $44_4$, and the second combustion chamber $44_2$ and third combustion chamber $44_3$ can be set in consideration of, for example, the relation thereof with an ignition sequence. An air intake pipe 40 which leads collectively to the supercharging turbines 62 of both the turbosuperchargers is connected to a single air cleaner 41, while a suction pipe 42 which extends collectively from the outlets of the supercharging turbines 62 to the combustion chambers 44 is provided with a single intercooler 43 midway. As a matter of course, however, such collective piping may well be branched into two channels.

Figure 6:
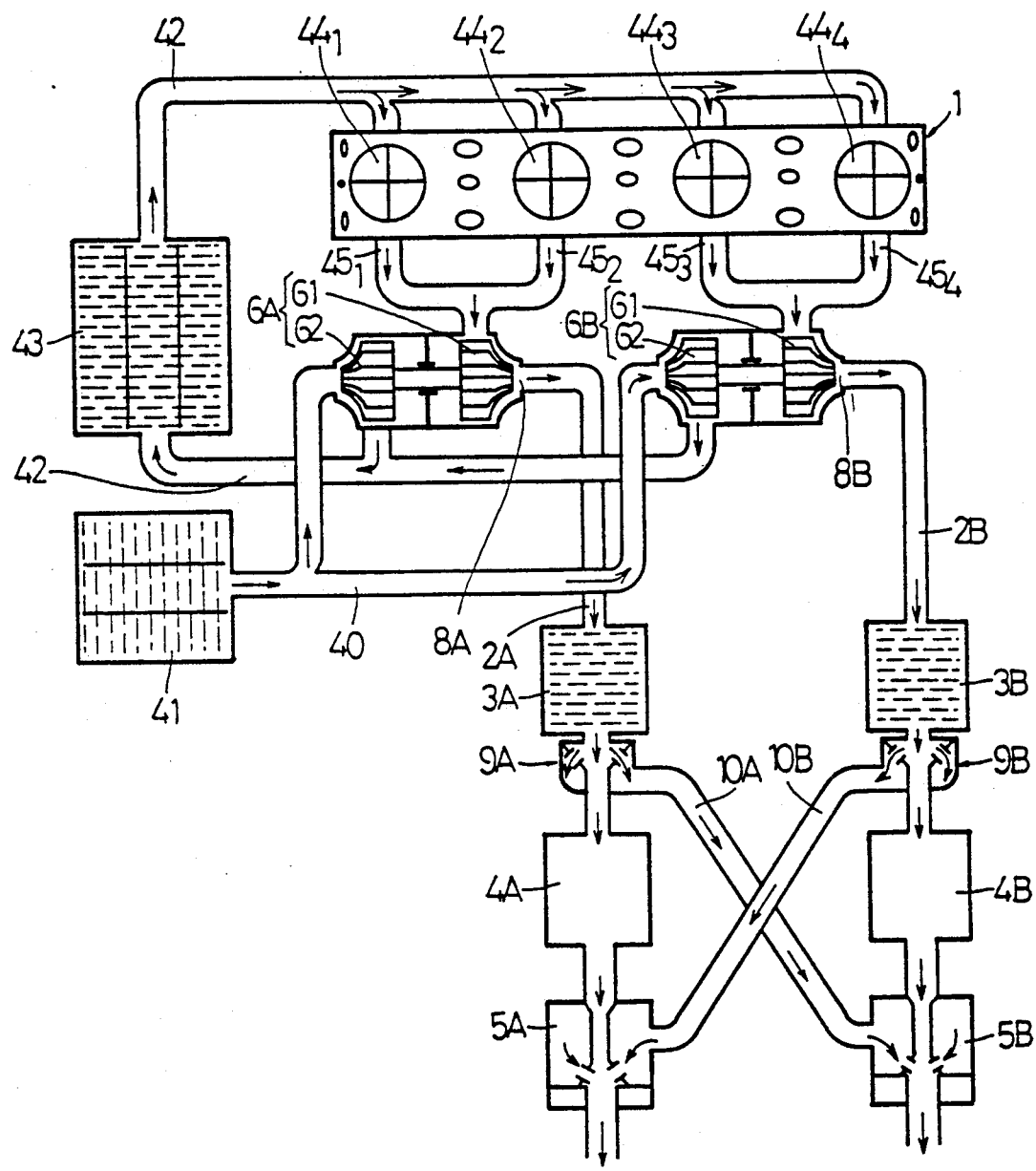
FIG. 6 is a schematic view of the general construction of a modification to the second embodiment.

Further, FIG. 6 shows a modification to the embodiment in FIG. 5. It is readily conjectured that, in driving a turbosupercharger 6 under a negative pressure, a higher suction efficiency will be attained when a suction port for the negative pressure is provided nearer a turbine outlet 8. Nevertheless, suction means 9 can be disposed in that part of an exhaust system pipe 2 which lies more downstream. The example in FIG. 6 indicates this fact, and it has the suction means 9A and 9B arranged directly behind catalyst units 3A and 3B, respectively. Therefore, the rate of exhaust gas purification does not lower. From the viewpoint of the exhaust gas purification, each of the suction pipes 10, 10A and 10B can be furnished with a catalyst 3' in the apparatuses of the embodiments in FIG. 1 and FIG. 5. Since the other construction of the modification in FIG. 6 may be quite the same as in the second embodiment in FIG. 5, the description thereof shall be omitted by quoting identical symbols. In a case where an engine having a plurality of cylinders is provided with a plurality of exhaust systems and where the respective exhaust systems are equipped with turbosuperchargers each of which is driven simultaneously by a positive pressure and a negative pressure, the suction actions need not always be performed crosswise as shown in FIG. 5 or FIG. 6, but a construction for independent actions in the individual systems can be naturally adopted. Also, the exhaust gas emitted from the combustion chambers 44 may be wholly introduced into the exhaust gas turbine 61 may well be utilized only partly. Alternatively, it is possible to changeover the operations of introducing the whole and part of the exhaust gas.

The method of operation of the present invention will be summed up with reference to the apparatuses for driving the turbosuperchargers as described above. It is understood that, in the present invention, the exhaust gas flows or functions as follows:

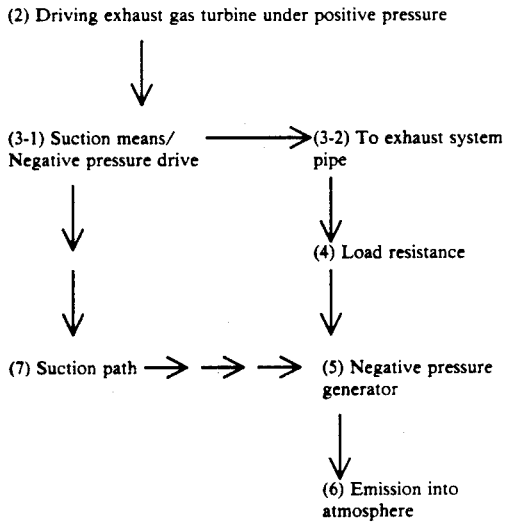

Owing to the above flow, as already elucidated, in the present invention, the turbosupercharger 6 is driven under the positive pressure by the so-called pushing-in of the exhaust gas streams, while at the same time, the exhaust gas streams are drawn by suction under the negative pressure. That is, the exhaust gas which drives the exhaust gas turbine 61 under the positive pressure is simultaneously drawn by suction at all times. Therefore, the emission efficiency of the exhaust system pipe is heightened to an incomparable degree, and the intense negative pressure formed by the negative pressure generator 5 gives rise to the action of deliberately drawing the exhaust gas streams in the exhaust gas turbine 61 toward the outlet. In the present invention, consequently, driving forces in both pushing-in and drawing-out directions act on the exhaust gas turbine 61, so that the limit of the r.p.m. of the turbine is remarkably raised as compared with the limit in an apparatus of the prior-art type wherein merely the pushing-in action proceeds. Since such positive and negative pressures act on the single turbine 61 simultaneously at all times, the starting characteristic of the turbine is improved, and the rise curve thereof approximates a rectilinear relation more. The operation of the exhaust gas turbine 61 according to the present invention is directly reflected on the rotating characteristic of the supercharging turbine 62 and the function thereof. Thus, the suction pressure is rectilinearly heightened to markedly improve the efficiency of charging.

Since combustion proceeds at the high charging efficiency, it might be thought that the temperature of the exhaust gas will also become higher. However, the fact is converse thereto. This is interpreted as follows: As stated before, the exhaust gas streams have their speeds raised, so that also the intake air streams have their speeds raised, whereby heat is carried away quickly. Therefore, the accumulation of heat is less prone to occur, with the result that the temperatures of and around the engine are prevented from rising drastically.

Thus, according to the present invention, the following effects can be expected:

1) A time lag involved till the development of the turbo effect becomes very short.

2) An output rise based on the turbo effect is very remarkable. Since, however, the output rise is rectilinearly proportional to controlled variables, it is rather controllable.

3) The limitation point of a boost pressure rises, and a restraint to raising engine r.p.m. is eliminated.

4) The overheat rate of an engine is decreased by lowering the temperature of a supercharger.

5) Unnecessary operations ascribable to the time lag decreases, and the efficiency of fuel consumption is improved accordingly.

As described above, the present invention brings out the performance of a turbosupercharger to a very high degree. Therefore, in case of a four-cycle gasoline engine by way of example, an output on the order of 200 H.P. can be readily attained with a displacement of 1600 c.c. Thus, as compared with the prior art, the invention achieves a sharp output enhancement with an identical displacement and suffices with a half or less displacement for attaining an identical output contrariwise. Accordingly, the invention has the features of contributing to reduction in the sizes of an engine etc. and also contributing to the diminution of noxious emission substances and the saving of resources.

I claim:

1. In a method of operating a turbosupercharger wherein an exhaust gas turbine is driven by exhaust gas energy, and a supercharging turbine is driven by the exhaust gas turbine to supercharge an engine with intake air the improvement comprising;
   introducing exhaust gas streams into a turbine inlet of said exhaust gas turbine to drive said exhaust gas turbine under a positive pressure;
   generating a negative pressure in an exhaust gas system downstream of the outlet of the exhaust gas turbine and;
   drawing exhaust gas streams passed through said exhaust gas turbine downstream of the outlet thereof and upstream of said negative pressure generation by said negative pressure generation to assist in driving said exhaust gas turbine.

2. A method of driving a turbosupercharger as claimed in claim 1, wherein;
   said negative pressure generation comprises accelerating the exhaust gas stream to be emitted into the atmosphere from the exhaust system through at least one tubular member, and expanding said exhaust gas stream downstream of said at least one tubular member to reduce the pressure thereof.

3. In an apparatus for driving a turbosupercharger, said turbosupercharger including an exhaust gas turbine having a turbine inlet for introducing exhaust gas streams emitted at high speed from at least one combustion chamber of an internal combustion engine and driven under positive pressure by the exhaust gas streams flowing through the inlet, an outlet, and a supercharging turbine driven by the exhaust gas turbine the improvement comprising:
   an exhaust system pipe connected to said turbine outlet for conducting exhaust gas streams after passing through said exhaust gas turbine to the atmosphere;
   a negative pressure generator disposed in a part of said exhaust system pipe immediately preceding the emission of the exhaust gas streams into the atmosphere comprising means for accelerating the exhaust gas streams into high-speed gas streams and forming an intense negative pressure; and suction conduit means connecting said negative pressure generator to said turbine outlet for assisting in driving said exhaust gas turbine.

4. An apparatus for driving a turbosupercharger as claimed in claim 3, and further comprising:

suction means disposed within said exhaust system pipe downstream of said exhause gas turbine outlet and upstream of said negative pressure generator, said conduit means connecting said suction means to said negative pressure generator.

5. In an apparatus for driving a turbosupercharger, said turbosupercharger including an exhaust gas turbine having a turbine inlet for introducing exhaust gas streams emitted at high speed from at least one combustion chamber of an internal combustion engine for driving by the positive pressure thereof the exhaust gas turbine by the flow of the exhaust gas streams through the turbine, an outlet, and a supercharging turbine driven by the exhaust gas turbine, the improvement comprising:

at least two exhaust system pipes connected to separate exhaust gas streams from separate cylinders of the engine;

at least two separate turbosuperchargers each comprising an exhaust gas turbine having an inlet connected to one of said at least two exhaust pipes and an outlet;

at least two exhaust gas outlet pipes each connected to one of said exhaust gas turbine outlets for conducting exhaust gas to the atmosphere;

a separate negative pressure generator in each of said exhaust gas outlet pipes at a position therein immediately preceding the emission of the exhaust gas stream into the atmosphere and comprising accelerating means for accelerating the respective exhaust gas stream into a high-speed gas stream and generating a negative pressure;

and separate conduit means connecting each of said negative pressure generators to a respective one of said exhaust gas turbine outlets for drawing exhaust gas from said respective exhaust gas turbine outlet for assisting in driving said exhaust gas turbines.

6. An apparatus as claimed in claim 5, wherein;

said conduit means from each of said negative pressure generators in said exhaust gas outlet pipe connected to one of said gas turbines is connected to said gas turbine outlet of the other of said exhaust gas turbines.

* * * * *